United States Patent
Crump

(10) Patent No.: US 12,430,307 B1
(45) Date of Patent: Sep. 30, 2025

(54) TRANSFORMING NEWS CONTENT FOR BIAS MITIGATION AND CONTENT ADJUSTMENT

(71) Applicant: NewsGenie, Inc., Mesa, AZ (US)

(72) Inventor: Jeffrey Don Crump, Mesa, AZ (US)

(73) Assignee: NewsGenie, Inc., Mesa, AZ (US)

( * ) Notice: Subject to any disclaimer, the term of this patent is extended or adjusted under 35 U.S.C. 154(b) by 0 days.

(21) Appl. No.: 19/024,474

(22) Filed: Jan. 16, 2025

(51) Int. Cl.
*G06F 40/30* (2020.01)
*G06F 16/215* (2019.01)
*G06F 40/284* (2020.01)

(52) U.S. Cl.
CPC .......... *G06F 16/215* (2019.01); *G06F 40/284* (2020.01); *G06F 40/30* (2020.01)

(58) Field of Classification Search
CPC .... G06F 40/211; G06F 40/253; G06F 40/268; G06F 40/284; G06F 40/30
See application file for complete search history.

(56) References Cited

U.S. PATENT DOCUMENTS

| | | | |
|---|---|---|---|
| 9,285,973 | B1 | 3/2016 | Gable |
| 10,082,994 | B1 * | 9/2018 | Ruiz .................. H04N 1/00244 |
| 10,430,504 | B1 * | 10/2019 | Narayanamurthi ... G06F 40/166 |
| 10,521,655 | B1 * | 12/2019 | Carbune .............. G06V 30/153 |
| 11,074,417 | B2 * | 7/2021 | Bhide .................. G06F 16/9536 |
| 11,526,701 | B2 * | 12/2022 | Weider .................... G06N 20/00 |
| 11,556,567 | B2 * | 1/2023 | Sinha ................ G06F 16/24578 |
| 11,599,250 | B1 * | 3/2023 | Peterson ............. G06F 3/04842 |
| 11,714,963 | B2 * | 8/2023 | Nagar ..................... G06F 40/30 704/9 |
| 12,141,878 | B2 * | 11/2024 | Shu ..................... G06F 16/9536 |
| 2007/0106508 | A1 * | 5/2007 | Kahn ...................... G10L 15/22 704/E15.04 |
| 2007/0150463 | A1 * | 6/2007 | Cannella ............... G06F 16/951 707/999.005 |

(Continued)

FOREIGN PATENT DOCUMENTS

CN        115017310 A  *  9/2022  ............. G06F 16/35

OTHER PUBLICATIONS

Ruan et al., booktitle={Proceedings of the 32nd ACM Conference on User Modeling, Adaptation and Personalization}, 2024, pp. ={67-77}. (Year: 2024).*

(Continued)

*Primary Examiner* — Lamont M Spooner
(74) *Attorney, Agent, or Firm* — Esplin & Associates, PC

(57) ABSTRACT

Methods, systems, and devices for transforming news content for bias mitigation and content adjustment are described. In some examples, a server may receive a plurality of news stories from various sources and may process them using natural language processing to extract key details and compute story embeddings. The server may then score the processed stories based on a regression-based model to determine a newsworthiness score for each story. Subsequently, the server may transform the news stories into revised versions with reduced bias by applying a plurality of language models. A final version of the news story may be selected from the revised versions based on a transformation weighted score that evaluates bias adjustment and content transformation. The selected final version of the news story may then be stored by the server for distribution.

20 Claims, 10 Drawing Sheets

(56) References Cited

U.S. PATENT DOCUMENTS

| | | | | |
|---|---|---|---|---|
| 2012/0158726 A1* | 6/2012 | Musgrove | ............. | G06F 16/353 |
| | | | | 707/E17.089 |
| 2015/0169580 A1* | 6/2015 | Epstein | ................ | G06F 16/951 |
| | | | | 707/749 |
| 2016/0283470 A1* | 9/2016 | Solomon | ................ | G06Q 50/26 |
| 2016/0357753 A1* | 12/2016 | Beaver | ............. | G06F 16/24578 |
| 2017/0329845 A1* | 11/2017 | Epstein | ............... | G06F 16/9535 |
| 2017/0371861 A1* | 12/2017 | Barborak | ............. | G06F 40/211 |
| 2018/0211333 A1* | 7/2018 | Lackman | ............... | G06N 20/00 |
| 2019/0121840 A1* | 4/2019 | Abbott | ................ | G06F 40/106 |
| 2019/0156348 A1* | 5/2019 | Levy | ................... | G06Q 30/018 |
| 2020/0218996 A1* | 7/2020 | Stromer-Galley | ....... | G06N 5/04 |
| 2020/0302011 A1* | 9/2020 | Mishra | ................ | G06F 40/242 |
| 2021/0019339 A1* | 1/2021 | Ghulati | ................ | G06F 40/284 |
| 2021/0103626 A1* | 4/2021 | Jolly | ................ | G06Q 30/0241 |
| 2021/0174222 A1* | 6/2021 | Dodwell | ................ | G06N 5/04 |
| 2021/0256629 A1* | 8/2021 | Jolly | ................ | G06Q 30/0282 |
| 2021/0334908 A1* | 10/2021 | Shu | ........................ | G06Q 50/01 |
| 2022/0317978 A1* | 10/2022 | Barik | ....................... | G06F 8/34 |
| 2022/0317979 A1* | 10/2022 | Araujo Soares | .... | G06F 16/9024 |
| 2022/0382728 A1* | 12/2022 | Religa | ................... | G06N 20/20 |
| 2024/0193481 A1* | 6/2024 | Bucklin | ................ | G06N 20/00 |
| 2024/0276041 A1* | 8/2024 | Xiao | ....................... | G06N 20/00 |
| 2024/0289649 A1* | 8/2024 | Saha | ....................... | G06N 5/022 |
| 2024/0320427 A1* | 9/2024 | Pawar | ................... | G06F 40/166 |
| 2024/0362410 A1* | 10/2024 | Dalal | ...................... | G06F 9/451 |
| 2024/0419921 A1* | 12/2024 | Barrow | .................. | G06F 40/40 |
| 2025/0103913 A1* | 3/2025 | Branson | ................ | G06N 5/022 |

OTHER PUBLICATIONS

Lee et al., title={Mitigating media bias through neutral article generation}, 2021, journal={arXiv preprint arXiv:2104.00336}, pp. 1-14 (Year: 2021).*

Chen et al., title={Computational Analysis and Mitigation of Textual Media Bias}, 2023, school={Paderborn University}, pp. 1-143 (Year: 2023).*

Liu et al., title={A transformer-based framework for neutralizing and reversing the political polarity of news articles}, journal={Proceedings of the ACM on Human-Computer Interaction}, vol. 5, No. CSCW1, pp. 1-26, 2021, publisher={ACM New York, NY, USA} (Year: 2021).*

* cited by examiner

TRANSFORMING NEWS CONTENT FOR BIAS MITIGATION AND CONTENT ADJUSTMENT

FIELD OF TECHNOLOGY

The present disclosure relates generally to database systems and data processing, and more specifically to transforming news content for bias mitigation and content adjustment.

BACKGROUND

In the field of news distribution, the presentation of information through various media outlets has become a cornerstone of modern society. With the rise of digital platforms, the volume of news stories generated and shared has increased exponentially. News content may come from a wide range of sources, each potentially offering different perspectives and narratives. The process of news curation and dissemination may involve multiple stakeholders, including content creators, editors, and distribution networks.

SUMMARY

The described techniques relate to improved methods, systems, devices, and apparatuses that support techniques for transforming news content for bias mitigation and content adjustment. In some examples, an automated system may utilize advanced natural language processing and machine learning models to evaluate and rewrite news stories, aiming to reduce bias across a wide array of predefined categories. The system may operate by ingesting original news content from various sources and employing a plurality of language models to analyze and transform the stories. Each model may provide a unique perspective on the content, identifying biases within the text based on a set scale. The system may then generate multiple iterations of the story, each with reduced bias as determined by the models' analysis.

Subsequently, the transformed versions of the stories may be scored using a proprietary algorithm that considers factors such as newsworthiness, content similarity, structural changes, and lexical adjustments. The scoring system may ensure that the final selected story not only exhibits a significant reduction in bias but also maintains the integrity and informativeness of the original content. The highest-scoring story, meeting predefined thresholds for bias and transformation, may then be deemed suitable for publication. This solution may offer a scalable and objective approach to news content curation, significantly reducing the influence of bias and providing the public with more trustworthy news.

A method for transforming news content for bias mitigation and content adjustment is described. The method may include receiving, by a server, a plurality of news stories from one or more sources. The method may include processing, by the server, the received news stories using natural language processing to extract key story details and compute story embeddings. The method may include scoring, by the server, the processed news stories based on a regression-based model to determine a newsworthiness score for each story. The method may include transforming, by the server, the news stories into revised versions with reduced bias in response to the scoring, the revised versions generated by applying a plurality of language models to the processed news stories. The method may include selecting, by the server, a final version of the news story from the revised versions based on a transformation weighted score that evaluates bias adjustment and content transformation. The method may include storing, by the server, the selected final version of the news story for distribution.

A system configured for transforming news content for bias mitigation and content adjustment is described. The system may include a processor and memory coupled with the processor. The system may include instructions stored in the memory and executable by the processor to cause the system to receive a plurality of news stories from one or more sources. The system may process the received news stories using natural language processing to extract key story details and compute story embeddings. The system may score the processed news stories based on a regression-based model to determine a newsworthiness score for each story. The system may transform the news stories into revised versions with reduced bias in response to the scoring, the revised versions generated by applying a plurality of language models to the processed news stories. The system may select a final version of the news story from the revised versions based on a transformation weighted score that evaluates bias adjustment and content transformation. The system may store the selected final version of the news story for distribution.

Another system for transforming news content for bias mitigation and content adjustment is described. The system may include means for receiving a plurality of news stories from one or more sources. The system may include means for processing the received news stories using natural language processing to extract key story details and compute story embeddings. The system may include means for scoring the processed news stories based on a regression-based model to determine a newsworthiness score for each story. The system may include means for transforming the news stories into revised versions with reduced bias in response to the scoring, the revised versions generated by applying a plurality of language models to the processed news stories. The system may include means for selecting a final version of the news story from the revised versions based on a transformation weighted score that evaluates bias adjustment and content transformation. The system may include means for storing the selected final version of the news story for distribution.

A non-transitory computer-readable medium storing code for transforming news content for bias mitigation and content adjustment is described. The code may include instructions executable by a processor to receive a plurality of news stories from one or more sources. The code may include instructions executable by a processor to process the received news stories using natural language processing to extract key story details and compute story embeddings. The code may include instructions executable by a processor to score the processed news stories based on a regression-based model to determine a newsworthiness score for each story. The code may include instructions executable by a processor to transform the news stories into revised versions with reduced bias in response to the scoring, the revised versions generated by applying a plurality of language models to the processed news stories. The code may include instructions executable by a processor to select a final version of the news story from the revised versions based on a transformation weighted score that evaluates bias adjustment and content transformation. The code may include instructions executable by a processor to store the selected final version of the news story for distribution.

Some examples of the method, systems, and non-transitory computer-readable medium described herein may further include operations, features, means, or instructions for identifying a bias of individual ones of the one or more sources.

In some examples of the method, systems, and non-transitory computer-readable medium described herein, regression may be used to perform comparative analyses between the one or more sources.

Some examples of the method, systems, and non-transitory computer-readable medium described herein may further include operations, features, means, or instructions for using regression analysis to identify an effectiveness of individual large language models (LLMs) for bias detection and remediation.

Some examples of the method, systems, and non-transitory computer-readable medium described herein may further include operations, features, means, or instructions for filtering the received news stories in response to a similarity threshold. Stories exceeding the similarity threshold may be flagged as redundant and not processed further.

In some examples of the method, systems, and non-transitory computer-readable medium described herein, the transformation weighted score may be adjusted based on a timeliness factor. The timeliness factor may be derived from the publication metadata of the news stories.

Some examples of the method, systems, and non-transitory computer-readable medium described herein may further include operations, features, means, or instructions for generating an audio or visual representation of the selected final version of the news story for distribution across multimedia platforms.

Some examples of the method, systems, and non-transitory computer-readable medium described herein may further include operations, features, means, or instructions for passing the selected final version of the news story to an external party for an independent bias evaluation. The external party may provide a bias score that is factored into the transformation weighted score.

Some examples of the method, systems, and non-transitory computer-readable medium described herein may further include operations, features, means, or instructions for categorizing the received news stories into predefined content categories. The scoring and transforming may be tailored based on the specific content category of each news story.

In some examples of the method, systems, and non-transitory computer-readable medium described herein, the processing may include identifying geographic relevance and sentiment indicators from the language patterns of the news stories.

In some examples of the method, systems, and non-transitory computer-readable medium described herein, the scoring may further include assigning a controversy score reflecting the potential of the news story to spark debate or strong opinions.

In some examples of the method, systems, and non-transitory computer-readable medium described herein, the revised versions may be further evaluated for lexical changes. The lexical changes may include adjustments to word choice and phrasing for enhanced precision.

In some examples of the method, systems, and non-transitory computer-readable medium described herein, the server may further apply a weighting adjustment to the transformation weighted score based on the uniqueness and timeliness of the news story content.

DETAILED DESCRIPTION

Figure 1:
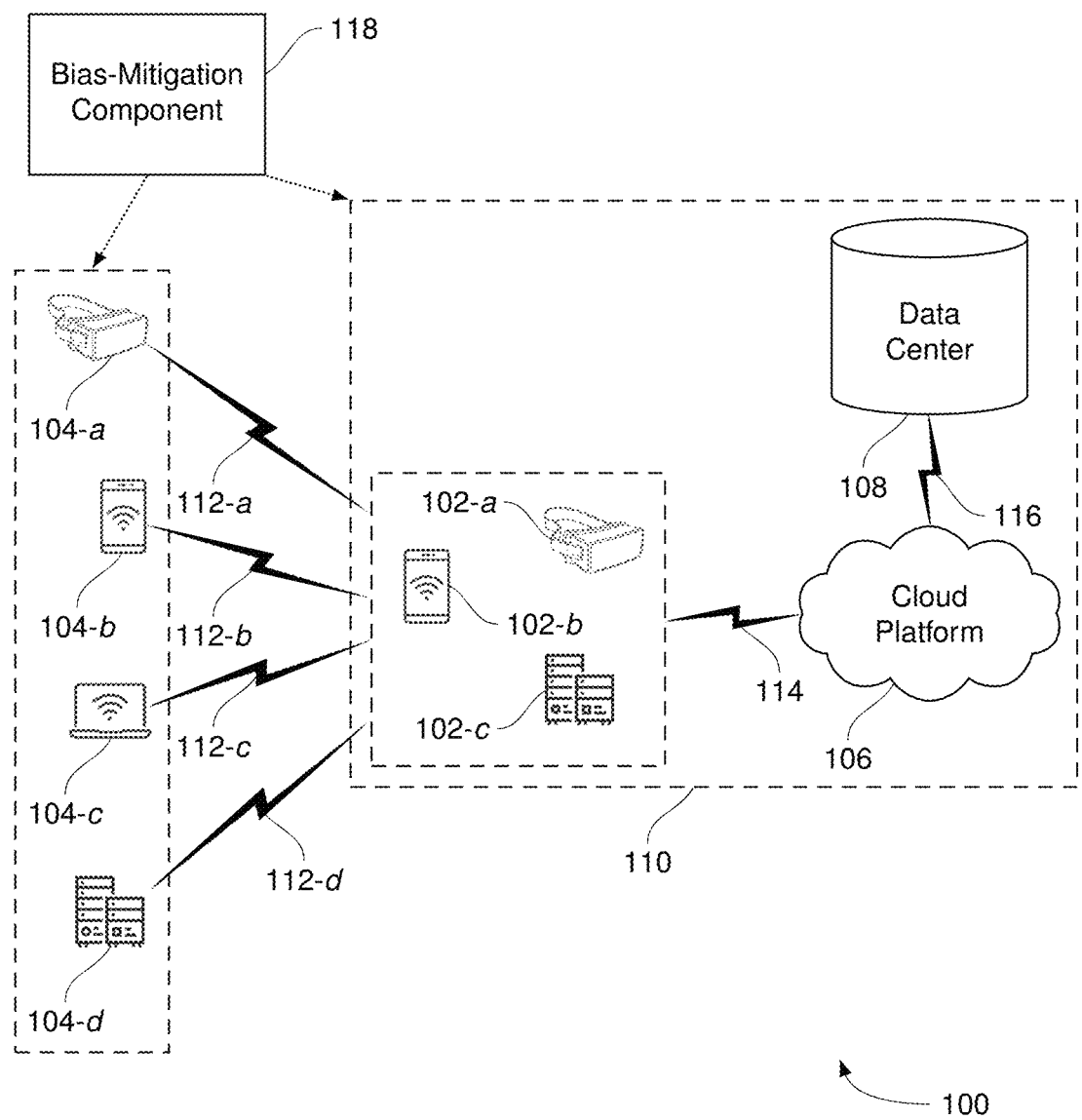
FIG. 1 illustrates an example of a system for data processing that supports transforming news content for bias mitigation and content adjustment in accordance with aspects of the present disclosure.

Methods, systems, devices, and apparatuses that support techniques for transforming news content for bias mitigation and content adjustment are disclosed. In some examples, the proliferation of biased news content may pose a significant problem for individuals seeking factual and impartial information. Existing solutions, such as fact-checking websites and bias rating tools, may rely heavily on manual intervention, which may be time-consuming and cannot keep pace with the continuous stream of news articles. Moreover, these solutions may often focus on a narrow range of biases, primarily political, neglecting other influential categories such as gender, race, or age biases. The subjective nature of human analysis may also introduce the risk of further bias, undermining the reliability of the assessment. Consequently, there may be a need for an automated, comprehensive, and scalable system capable of identifying and mitigating biases across a broad spectrum of categories within news content, thereby enhancing the objectivity and trustworthiness of the news presented to the public.

According to some implementations, a system may receive original stories from various sources, such as social media platforms and websites. This system may use natural language processing to extract significant details from these stories, such as publication metadata, core narrative elements, and contextual factors. The system may then transform these stories into a vectorized format through the computation of story embeddings, which capture the semantic meaning of the content.

The system may calculate the similarity between stories using embedding-based analysis and cosine similarity measurements to avoid redundancy and over-reporting. A similarity threshold may be used to flag stories as redundant if the cosine similarity score between a new story and an existing published story exceeds a certain value. In some implementations, stories with a score of 0.8 or below may be considered unique enough to proceed to the next stages.

Feedback integration may be a part of the system, where the uniqueness score within the Newsworthiness Score and the Repost Avoidance Score calculations may be adjusted based on similarity findings to minimize redundancy in repost decisions. Preprocessed stories may undergo scoring based on several criteria, including the Newsworthiness Score, which is a regression-based model that determines the significance and relevance of the story, and the Repost Avoidance Score, which prevents duplication of similar or repeated stories.

The system may also determine bias and transformation scores for reduced-bias representation. These scores may be based on predefined thresholds for various bias categories and the degree of transformation achieved in the rewritten content. Decision logic may be applied to scored stories to categorize them by type and apply tailored decision criteria. Stories with high Newsworthiness Score and Repost Avoidance Score may be prioritized for publishing, while others may be deprioritized or abandoned.

Approved stories for bias processing may be subjected to further transformation. The system may measure bias across a proprietary set of criteria and generate multiple iterations of the story using large language models. Each iteration may be evaluated for bias and transformation, and the best-performing iteration may be selected based on established thresholds and a transformation weighted score.

Various bias categories may be defined in the system, each with specific thresholds, weights, and impacts. Each bias category may be evaluated to ensure the rewritten story does not exceed the set thresholds. The system may evaluate the degree of modification in the story to ensure it is sufficiently distinct from the original while aligning with guidelines for transformative works. Components of transformation scoring may include content similarity, bias adjustment, structural changes, and lexical changes.

The finalized content may be distributed across multiple platforms, including websites, social media, podcasts, smart TV platforms, network television, and mobile applications. The system may integrate with various application programming interfaces and platforms to access source stories, generate and evaluate content, permit customer access to backend data, and enable the generation of multimedia elements.

Functional components of the system may include embedding and similarity processing, scoring models such as the Newsworthiness Score and Repost Avoidance Score, transformation metrics, decision logic, bias determination and transformation, and customer access interfaces. A transformation weighted score may be a calculated value that takes into consideration the amount of bias adjustment, similarity of content, structural, and lexical changes. It may be used as a final tiebreaker for candidate stories.

The system may produce decisions to either send the story for bias processing or abandon the story based on the scores and thresholds. Finalized content may be ready for distribution if it meets the criteria of no bias values exceeding individual bias thresholds and a content similarity score equal to or below a set percentage.

Aspects of the subject matter described in this disclosure can be implemented to realize one or more of the following potential advantages. The described techniques may be implemented to support the creation of a balanced news dissemination platform that may reduce the propagation of biased information. The system may facilitate the generation of content that is more aligned with factual reporting by evaluating and adjusting for biases in real-time. The iterative process of story transformation may enhance the accuracy and neutrality of news stories, which may lead to increased trust and credibility among users. The integration with various platforms may allow for a wide dissemination of content, potentially reaching a diverse audience. The system may provide a dynamic and responsive news source that may adapt to the evolving landscape of news reporting and consumption. The transformation scoring and bias adjustment processes may ensure that the content not only meets editorial standards but also adheres to fair use policies, which may protect the platform from legal challenges related to copyright infringement.

Aspects of the disclosure are initially described in the context of networked computing systems. Aspects of the disclosure are additionally illustrated by and described with reference to example implementations. Aspects of the disclosure are further illustrated by and described with reference to apparatus diagrams, system diagrams, and flowcharts that relate to transforming news content for bias mitigation and content adjustment.

FIG. 1 illustrates an example of a system 100 that supports transforming news content for bias mitigation and content adjustment in accordance with various aspects of the present disclosure. The system 100 includes cloud clients 102, user devices 104, a cloud platform 106, and a data center 108. Cloud platform 106 may be an example of a public or private cloud network. A cloud client 102 may access cloud platform 106 over a network connection 114. The network connection 114 may include a wired connection, a wireless connection, or both. The network may implement transfer control protocol and internet protocol (TCP/IP), such as the Internet, or may implement other network protocols. A cloud client 102 may be an example of a computing device, such as a server (e.g., cloud client 102-*a*), a smartphone (e.g., cloud client 102-*b*), or a laptop (e.g., cloud client 102-*c*). In other examples, a cloud client 102 may be a desktop computer, a tablet, a sensor, or another computing device or system capable of generating, analyzing, transmitting, or receiving communications. In some examples, a cloud client 102 may be part of a business, an enterprise, a non-profit, a startup, or any other organization type.

A cloud client 102 may facilitate communication between the data center 108 and one or multiple user devices 104 to implement an online environment. The network connection 112 may include communications, opportunities, purchases, sales, or any other interaction between a cloud client 102 and a user device 104. The network connection 112 may include a wired connection, a wireless connection, or both. A cloud client 102 may access cloud platform 106 to store, manage, and process the data communicated via one or more network connections 112. In some cases, the cloud client 102 may have an associated security or permission level. A cloud client 102 may have access to certain applications, data, and database information within cloud platform 106 based on the associated security or permission level, and may not have access to others.

The user device 104 may include a bias-mitigation component 118. The user device 104 may interact with the cloud client 102 over network connection 112. The network may implement transfer control protocol and internet protocol (TCP/IP), such as the Internet, or may implement other network protocols. The network connection 112 may facilitate transport of data via email, web, text messages, mail, or any other appropriate form of electronic interaction (e.g., network connections 112-*a*, 112-*b*, 112-*c*, and 112-*d*) via a computer network. In an example, the user device 104 may be computing device such as a wearable device 104-*a*, smartphone 104-*b*, a laptop 104-*c*, or a server 104-*d*. In other cases, the user device 104 may be another computing system. In some cases, the user device 104 may be operated by a user or group of users. The user or group of users may be a customer, associated with a business, a manufacturer, or any other appropriate organization.

Cloud platform 106 may offer an on-demand database service to the cloud client 102. In some cases, cloud platform 106 may be an example of a multi-tenant database system. In this case, cloud platform 106 may serve multiple cloud clients 102 with a single instance of software. However, other types of systems may be implemented, including—but not limited to—client-server systems, mobile device systems, and mobile network systems. In some cases, cloud platform 106 may support an online application. This may include support for sales between buyers and sellers operating user devices 104, service, marketing of products posted by buyers, community interactions between buyers and sellers, analytics, such as user-interaction metrics, applications (e.g., computer vision and machine learning), and the Internet of Things (IoT). Cloud platform 106 may receive data associated with generation of an online environment from the cloud client 102 over network connection 114, and may store and analyze the data. In some cases, cloud platform 106 may receive data directly from a user device 104 and the cloud client 102. In some cases, the cloud client 102 may develop applications to run on cloud platform 106. Cloud platform 106 may be implemented using remote servers. In some cases, the remote servers may be located at one or more data centers 108.

Data center 108 may include multiple servers. The multiple servers may be used for data storage, management, and processing. Data center 108 may receive data from cloud platform 106 via connection 116, or directly from the cloud client 102 or via network connection 112 between a user device 104 and the cloud client 102. The connection 116 may include a wired connection, a wireless connection, or both. Data center 108 may utilize multiple redundancies for security purposes. In some cases, the data stored at data center 108 may be backed up by copies of the data at a different data center (not pictured).

Server system 110 may include cloud clients 102, a cloud platform 106, a bias-mitigation component 118, and a data center 108 that may coordinate with cloud platform 106 and data center 108 to implement an online environment. In some cases, data processing may occur at any of the components of server system 110, or at a combination of these components. Thus, the bias-mitigation component 118 may be included in the user device 104, server system 110, or in part or in whole in both. In some cases, servers may perform the data processing. The servers may be a cloud client 102 or located at data center 108.

Some or all of the functionality attributed to the bias-mitigation component 118 may be embodied or performed by one or more user devices 104, one or more components of server system 110 (e.g., cloud clients 102, a cloud platform 106, and/or a data center 108), and/or other components of system 100. The bias-mitigation component 118 may receive signals and inputs from user device 104 directly. via cloud clients 102, and/or via cloud platform 106 or data center 116.

As described herein, the bias-mitigation component 118 may operate within the context of the system 100 to perform specific functions related to the transformation of news content for bias mitigation and content adjustment. Upon receiving a plurality of news stories from one or more sources, the bias-mitigation component 118 may process these stories using natural language processing to extract key details and compute story embeddings. The component may then score the stories using a regression-based model to determine a newsworthiness score for each. Following this, the bias-mitigation component 118 may transform the news stories into revised versions with reduced bias by applying a plurality of language models. A final version of the news story may be selected from the revised versions based on a transformation weighted score that evaluates both bias adjustment and content transformation. The selected final version may then be stored by the server for distribution. This process may be facilitated by the interaction of the bias-mitigation component 118 with other elements of the system 100, such as cloud clients 102, cloud platform 106, and data center 108, to implement an online environment conducive to the distribution of unbiased news content.

It should be appreciated by a person skilled in the art that one or more aspects of the disclosure may be implemented in a system 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2A:
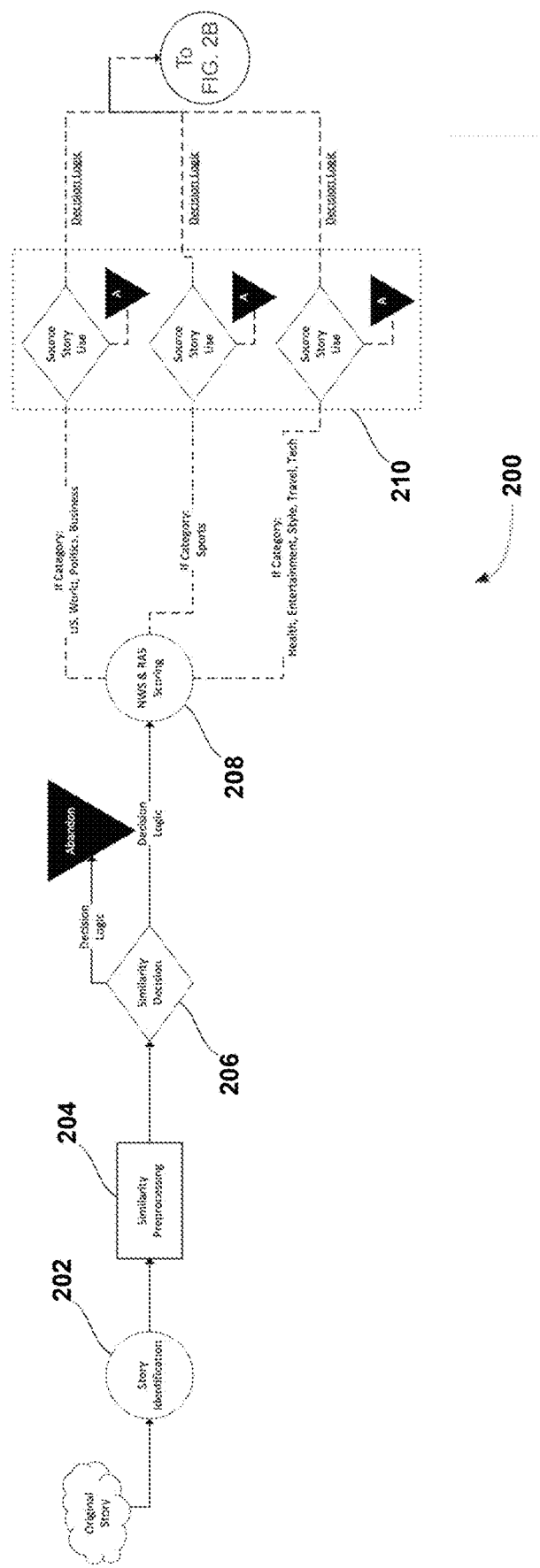
FIGS. 2A and 2B illustrates a news evaluation flowchart that supports techniques for transforming news content for bias mitigation and content adjustment in accordance with various aspects of the present disclosure.
Figure 2B:
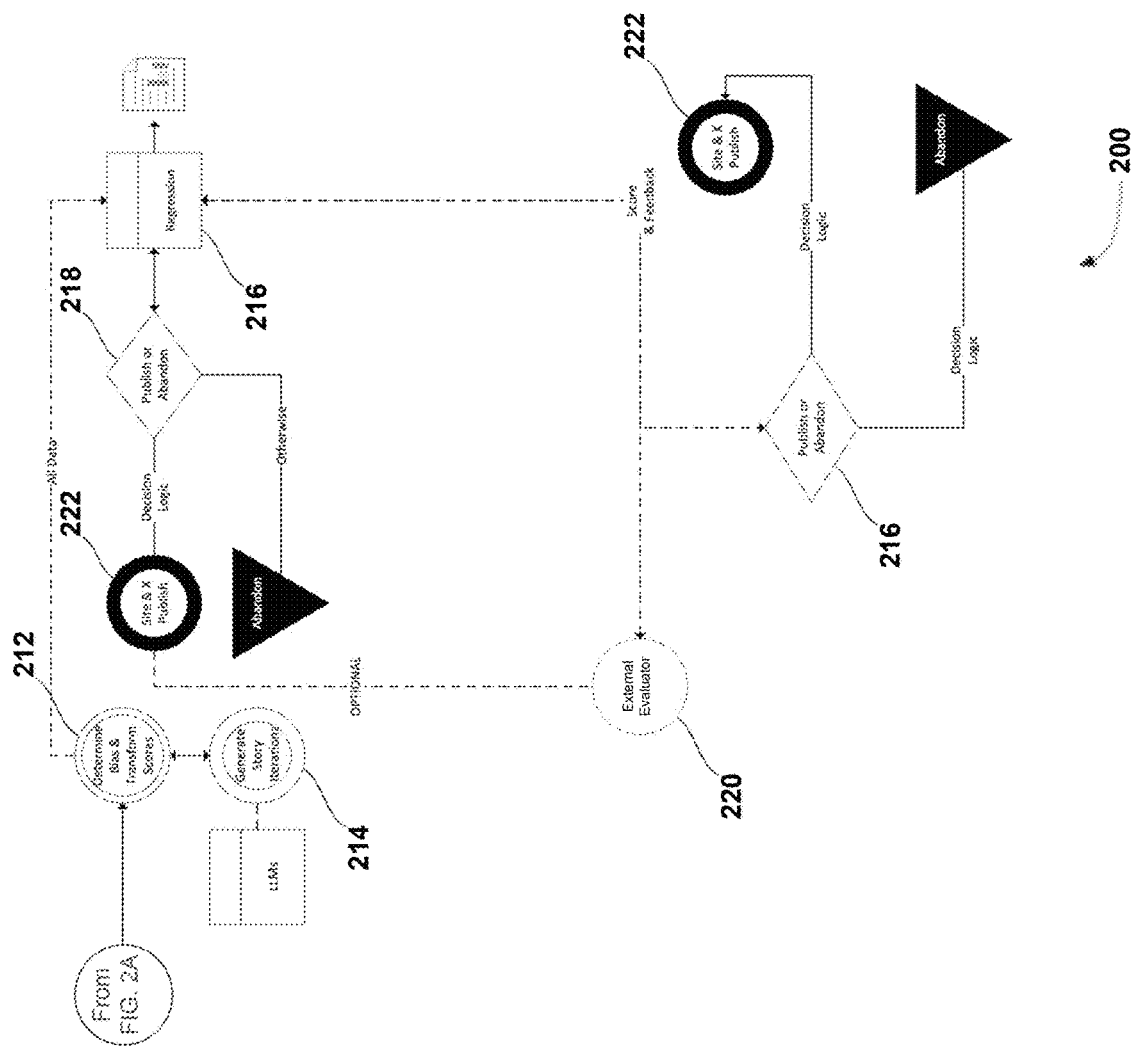

FIGS. 2A and 2B illustrate a news evaluation flowchart 200 that supports techniques for transforming news content for bias mitigation and content adjustment in accordance with various aspects of the present disclosure. Operations illustrated in the news evaluation flowchart 200 may involve a cloud platform 106, user devices 104, and/or other participants, which may be examples of corresponding devices described herein. The news evaluation flowchart 200 may describe a process for extracting key story details, computing story embeddings, calculating similarity, determining newsworthiness and repost avoidance scores, transforming bias, generating story iterations, and publishing or abandoning stories.

At step 202, the cloud platform 106 may extract key story details using natural language processing. The cloud platform 106 may apply algorithms to identify the main elements of a news story. The cloud platform 106 may process textual data to recognize entities such as people, locations, and organizations. The cloud platform 106 may analyze the language to understand the context of the news event. The cloud platform 106 may use machine learning models to interpret the sentiment of the news content.

At step 204, the cloud platform 106 may compute story embeddings to represent the story in a vectorized format. The cloud platform 106 may convert the textual information of a story into numerical data. The cloud platform 106 may use embedding techniques to capture the semantic meaning of the story. The cloud platform 106 may create a multidimensional space where similar stories are positioned closer together. The cloud platform 106 may employ pretrained models to facilitate the embedding process.

At step 206, the cloud platform 106 may determine similarity between stories to avoid redundancy and over-reporting. The cloud platform 106 may compare new story embeddings with existing ones in the database. The cloud platform 106 may use similarity metrics to quantify the degree of overlap between stories. The cloud platform 106 may flag stories that are too similar to previously published content. The cloud platform 106 may filter out stories that do not provide new information.

At step 208, the cloud platform 106 may determine a newsworthiness score. The cloud platform 106 may evaluate the relevance of a story based on current events. The cloud platform 106 may assign a numerical value reflecting the story's significance. The cloud platform 106 may consider factors such as timeliness and public interest. The cloud platform 106 may use a scoring model to rank stories according to their newsworthiness.

At step 210, the cloud platform 106 may determine a repost avoidance score. The cloud platform 106 may assess the need to republish a story based on its uniqueness. The cloud platform 106 may calculate a score to prevent the circulation of duplicate content. The cloud platform 106 may take into account the frequency of updates on a particular story. The cloud platform 106 may prioritize stories that offer new perspectives or information.

At step 212, the cloud platform 106 may determine bias and transform scores. The cloud platform 106 may identify potential biases present in a news story. The cloud platform 106 may apply criteria to measure the level of bias in different categories. The cloud platform 106 may adjust the content to reduce identified biases. The cloud platform 106 may score the story based on the effectiveness of the bias transformation.

At step 214, the cloud platform 106 may generate story iterations. The cloud platform 106 may create multiple versions of a story with varying degrees of bias mitigation. The cloud platform 106 may use language models to rewrite the story content. The cloud platform 106 may evaluate each iteration for bias and quality. The cloud platform 106 may select the best iteration for potential publication.

At step 216, the cloud platform 106 may score the selected best iteration for potential publication based on a regression-based model to determine a newsworthiness score for the story.

At step 218, the cloud platform 106 may publish or abandon the story. The cloud platform 106 may decide to release the story based on its final scores. The cloud platform 106 may discard the story if it does not meet the set thresholds for publication. The cloud platform 106 may archive the story for internal records. The cloud platform 106 may update the database with the decision outcome.

At step 220, the cloud platform 106 may pass the selected final version of the news story to an external party for an independent bias evaluation. In some implementations, the external party may function as an independent organization that specializes in media analysis. This external party may employ proprietary methods to evaluate the potential level of bias in a news story. The bias score they provide may be presented as a numerical value and may indicate the extent of neutrality in the news content.

At step 222, the user devices 110 may provide access to published stories. The user devices 110 may display the stories selected for publication. The user devices 110 may allow users to read the transformed news content. The user devices 110 may offer a platform for users to interact with the news stories. The user devices 110 may facilitate the distribution of news to a wider audience.

Figure 3:
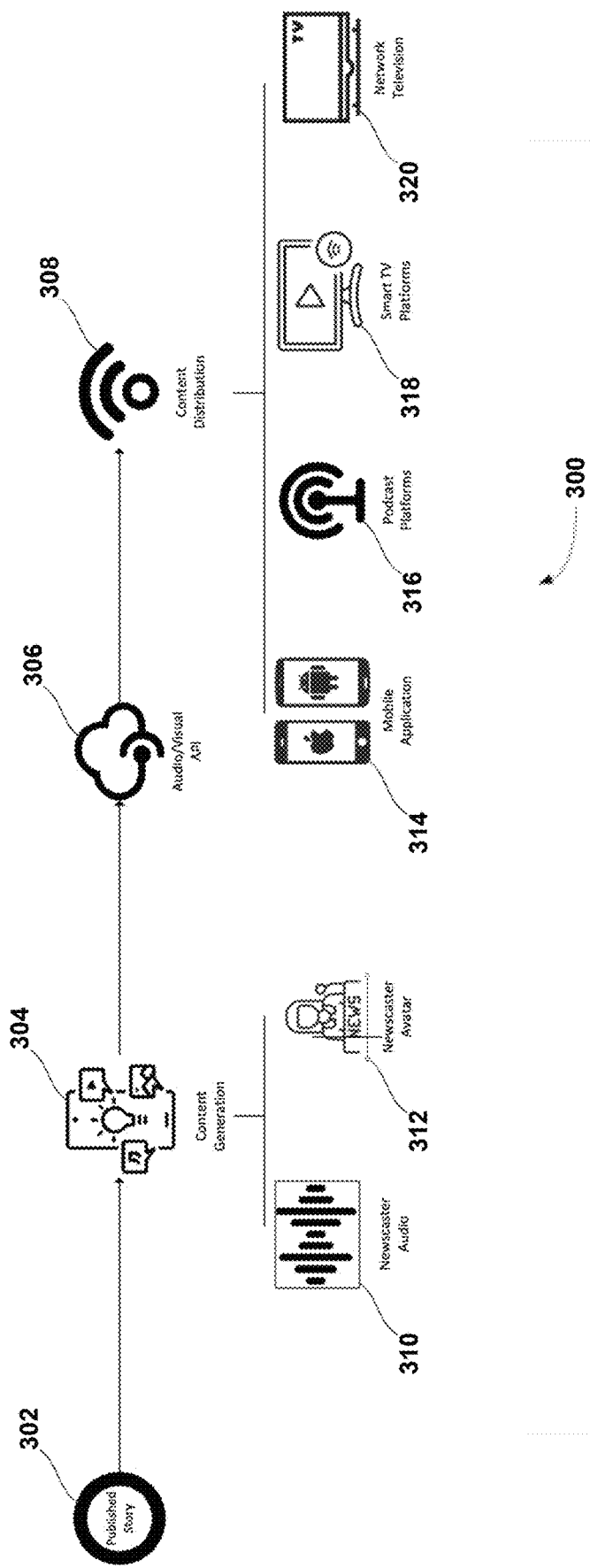
FIG. 3 shows content distribution platforms which supports techniques for transforming news content for bias mitigation and content adjustment in accordance with various aspects of the present disclosure.

FIG. 3 shows content distribution platforms 300 which supports techniques for transforming news content for bias mitigation and content adjustment in accordance with various aspects of the present disclosure. As depicted in FIG. 3, the content distribution platforms 300 may include one or more of a published story 302, a content generation 304, an audio/visual API 306, a content distribution 308, a newscaster audio 310, a newscaster avatar 312, a mobile application 314, a podcast platforms 316, a smart TV platforms 318, a network television 320, and/or other components.

The published story 302 may represent the finalized news content ready for dissemination across various platforms. The published story 302 may be the end product of the content generation and bias mitigation process. The published story 302 may be distributed through various channels such as online news websites, social media, or traditional media outlets.

The content generation 304 may include tools for creating and editing news content prior to publication. The content generation 304 may involve a suite of software applications that journalists and editors use to draft, revise, and finalize news articles. The content generation 304 may interface with the audio/visual API 306 to incorporate multimedia elements into the news content.

The audio/visual API 306 may provide interfaces for integrating audio and visual elements into the news content. The audio/visual API 306 may allow for the embedding of video clips, sound bites, and images that complement the textual news content. The audio/visual API 306 may work in conjunction with the newscaster audio 310 and newscaster avatar 312 to create a multimedia news presentation.

The content distribution 308 may handle the delivery of news content to intended audiences through selected channels. The content distribution 308 may involve the use of content management systems that publish and push content to various platforms. The content distribution 308 may rely on network protocols and delivery networks to ensure the news reaches consumers efficiently.

The newscaster audio 310 may involve the production of voice recordings for use in audio-based news delivery systems. The newscaster audio 310 may be created by voice actors or synthesized using text-to-speech technologies. The newscaster audio 310 may be used in radio broadcasts, podcasts, or as voiceover for video news segments.

The newscaster avatar 312 may include a virtual representation of a news presenter for visual media platforms. The newscaster avatar 312 may be designed to mimic human expressions and gestures to engage viewers. The newscaster avatar 312 may be displayed on digital platforms such as news websites or mobile applications 314.

The mobile application 314 may serve as a platform for accessing news content on mobile devices. The mobile application 314 may offer users personalized news feeds and notifications about breaking news. The mobile application 314 may allow users to interact with the news content, such as by sharing articles or watching videos.

The podcast platforms 316 may facilitate the distribution of news content in podcast format to various podcast services. The podcast platforms 316 may provide tools for uploading and managing podcast episodes. The podcast platforms 316 may enable listeners to subscribe to news channels and receive updates automatically.

The smart TV platforms 318 may enable the streaming of news content on internet-connected television devices. The smart TV platforms 318 may offer apps that viewers can install to access news channels and on-demand news content. The smart TV platforms 318 may support high-definition video streaming for an enhanced viewing experience.

The network television 320 may provide traditional broadcast channels for airing news content to a wide audience. The network television 320 may include national and local news stations that deliver news programs at scheduled times. The network television 320 may reach viewers through cable, satellite, or terrestrial broadcasting methods.

In some implementations, the content generation 304 may leverage natural language processing to extract key details from news stories for transformation. The audio/visual API 306 may facilitate the integration of transformed news content with multimedia elements, while the content distribution 308 may disseminate the revised news stories across the content distribution platforms 300. The newscaster audio 310 and newscaster avatar 312 may present the transformed news content, which has undergone bias mitigation through iterative processing by multiple language models. The mobile application 314, podcast platforms 316, smart TV platforms 318, and network television 320 may each play a role in delivering the transformed news content, scored and selected based on bias reduction and content transformation criteria, to a diverse audience.

Figure 4:
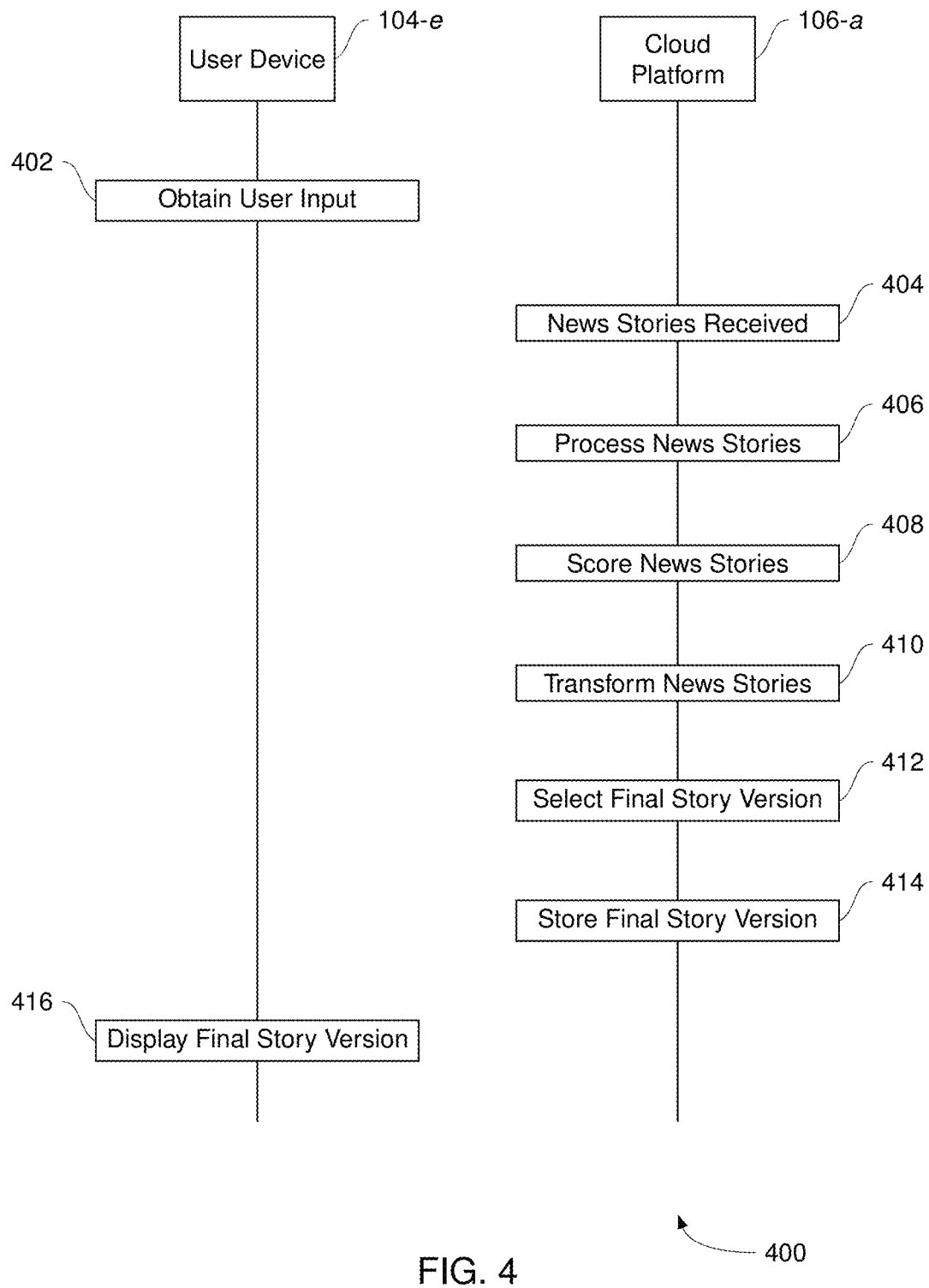
FIG. 4 illustrates an example of a process flow that supports transforming news content for bias mitigation and content adjustment in accordance with various aspects of the present disclosure.

FIG. 4 illustrates an example of a process flow 400 that supports transforming news content for bias mitigation and content adjustment in accordance with aspects of the present disclosure. In some examples, the process flow 400 may implement aspects of the system 100. For example, the process flow 400 may include a user device 104-*e* and a cloud platform 106-*a*, which may be examples of corresponding devices described herein. In some implementations, a cloud platform 106-*a* receives news stories from various sources, processes them using natural language processing to extract details and compute embeddings, scores them for newsworthiness, transforms them to reduce bias, selects the best-transformed version, and stores it for distribution, all while interacting with a user device 104-*e*.

At step 402, the user device 104-*e* may obtain user input to select and send a request for news stories to the cloud platform 106-*a*. For example, the user device 104-*e* may present a graphical user interface allowing the user to filter news stories by category, such as politics or technology, before sending the request to the cloud platform 106-*a*. In some implementations, the user device 104-*e* may provide a search function enabling the user to input specific keywords or phrases related to the news stories they wish to receive from the cloud platform 106-*a*. The user device 104-*e* may also allow the user to set preferences for the type of news stories they are interested in, which may be stored and used to tailor future news story requests sent to the cloud platform 106-*a*.

At step 404, the cloud platform 106-*a* may receive a plurality of news stories from one or more sources. In some implementations, such receipt may be in response to the request from the user device 104-*e*. In some implementations, the plurality of new stories may be received through monitored news feeds, internet scanning, or other automated techniques. For example, the cloud platform 106-*a* may process the received news stories to determine key data points such as publication metadata, core narrative elements, and contextual factors. In some implementations, the cloud platform 106-*a* may apply natural language processing techniques to extract significant details from the news stories, which may include the title, summary, key events, participants, outcomes, and notable quotes. The cloud platform 106-*a* may then store the extracted information in a structured format for further processing steps as required by the system.

At step 406, the cloud platform 106-*a* may process the received news stories using natural language processing to extract key story details and compute story embeddings. For example, the cloud platform 106-*a* may utilize a pre-trained natural language processing model to identify the main entities and events within the text of the news stories. In some implementations, the cloud platform 106-*a* may determine story embeddings by converting the textual information of the news stories into a vectorized format that represents the semantic meaning of the content. The cloud platform 106-*a* may then store these embeddings in a database for further analysis or comparison with other news story embeddings.

At step 408, the cloud platform 106-*a* may score the processed news stories based on a regression-based model to determine a newsworthiness score for each story. For example, the cloud platform 106-*a* may assign higher newsworthiness scores to stories that have occurred more recently, indicating a higher relevance to current events. In some implementations, the cloud platform 106-*a* may also consider the volume of social media activity related to a story as a factor in the newsworthiness score, where a higher volume of mentions may correlate with a higher score. Additionally, the cloud platform 106-*a* may adjust the newsworthiness score based on the presence of certain keywords or phrases that are trending at the time of scoring.

At step 410, the cloud platform 106-*a* may transform the news stories into revised versions with reduced bias in response to the scoring, the revised versions generated by applying a plurality of language models to the processed news stories. For example, the cloud platform 106-*a* may apply different language models that specialize in various aspects of language understanding to ensure a comprehensive reduction of bias across multiple dimensions, such as political or cultural biases. In some implementations, the cloud platform 106-*a* may utilize a combination of pre-trained and fine-tuned language models to adapt to the specific linguistic nuances and context of the news stories being processed. The cloud platform 106-*a* may also apply a sequence of language models in a pipeline, where each model may focus on reducing specific types of bias before passing the story to the next model for further processing.

At step 412, the cloud platform 106-*a* may select a final version of the news story from the revised versions based on a transformation weighted score that evaluates bias adjustment and content transformation. For example, the cloud platform 106-*a* may determine the transformation weighted score by considering the extent of bias adjustment in each revised version, where a higher degree of bias reduction may contribute to a higher score. In some implementations, the cloud platform 106-*a* may also assess the level of content transformation by evaluating changes in the narrative structure or language usage from the original to the revised versions. The cloud platform 106-*a* may then compare the transformation weighted scores of all revised versions and select the one with the highest score as the final version for publication.

At step 414, the cloud platform 106-*a* may store the selected final version of the news story for distribution. For example, the cloud platform 106-*a* may utilize a database system to maintain the final version of the news story, ensuring that it is readily accessible for future retrieval and dissemination. In some implementations, the cloud platform 106-*a* may assign a unique identifier to the final version of the news story, which may be used to track the distribution and access of the story across various channels. Additionally, the cloud platform 106-a may categorize the final version of the news story based on content, such as by topic or region, to streamline the distribution process to targeted audiences.

At step 416, the user device 104-e may display the final version of the news story as presented by the cloud platform 106-a. For example, the user device 104-e may utilize a graphical user interface to present the news story in a readable format. In some implementations, the user device 104-e may allow the user to interact with the displayed news story, such as by zooming in on text or playing embedded multimedia content. The user device 104-e may also offer options to share the news story via social media directly from the display interface.

Figure 5:
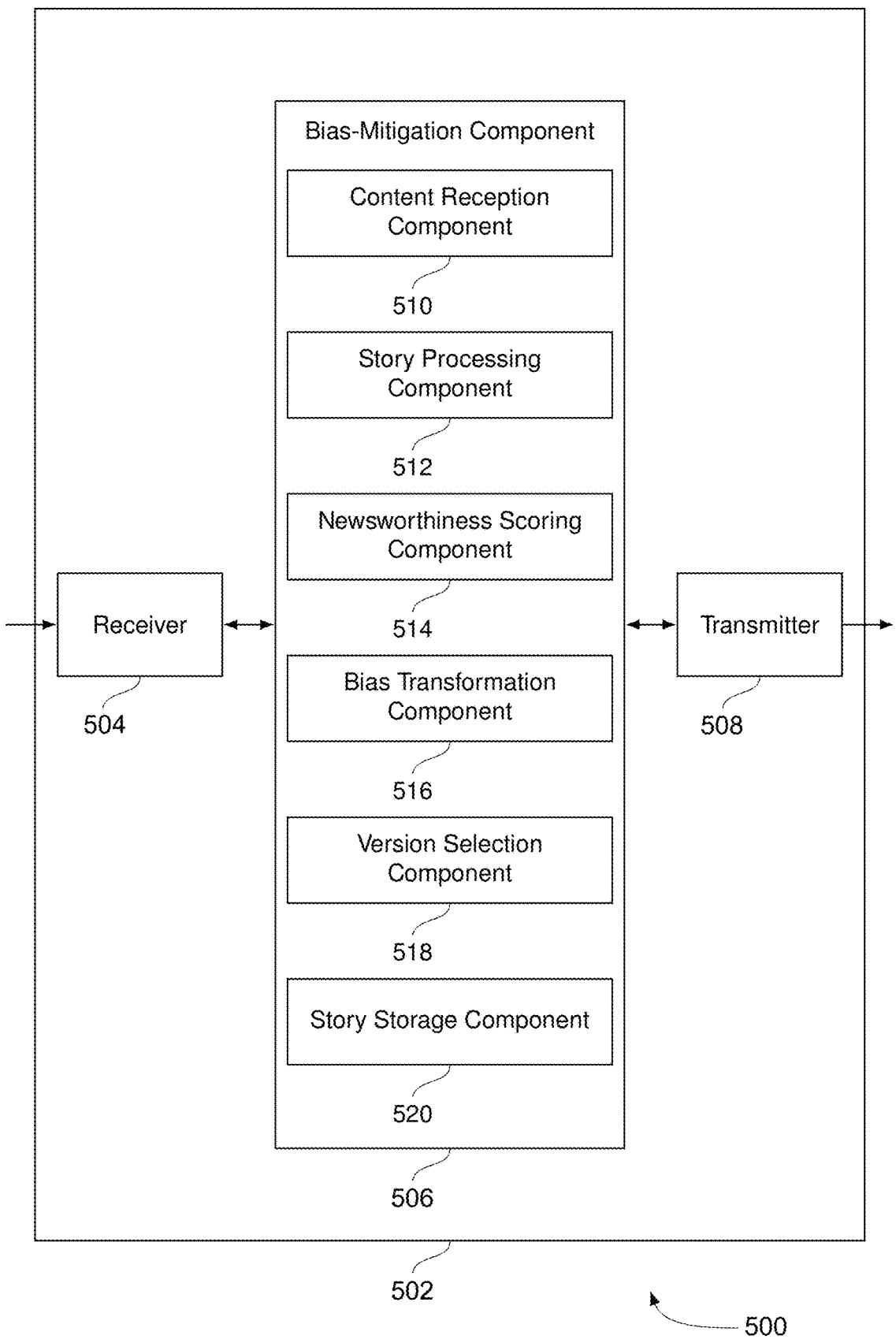
FIG. 5 shows a block diagram of an apparatus that supports transforming news content for bias mitigation and content adjustment in accordance with various aspects of the present disclosure.

FIG. 5 shows a block diagram 500 of an apparatus 502 that supports transforming news content for bias mitigation and content adjustment in accordance with various aspects of the present disclosure. The apparatus 502 may include an input module 504, bias-mitigation component 506, and an output module 508. The apparatus 502 may also include a processor. Each of these components may be in communication with one another (e.g., via one or more buses). In some cases, the apparatus 502 may be an example of a user terminal, a database server, or a system containing multiple computing devices.

The input module 504 may manage input signals for the apparatus 502. For example, the input module 504 may identify input signals based on an interaction with a modem, a keyboard, a mouse, a touchscreen, or a similar device. These input signals may be associated with user input or processing at other components or devices. In some cases, the input module 504 may utilize an operating system such as iOS®, ANDROID®, MS-DOS®, MS-WINDOWS®, OS/2®, UNIX®, LINUX®, or another known operating system to handle input signals. The input module 504 may send aspects of these input signals to other components of the apparatus 502 for processing. For example, the input module 504 may transmit input signals to the bias-mitigation component 506 to support face detection to address privacy in publishing image datasets. In some cases, the input module 504 may be a component of an input/output (I/O) controller 706 as described with reference to FIG. 7.

The bias-mitigation component 506 may include one or more of a content reception component 510, a story processing component 512, a newsworthiness scoring component 514, a bias transformation component 516, a version selection component 518, a story storage component 520, and/or other components. The bias-mitigation component 506 may be an example of aspects of the bias-mitigation component 602 or 704 described with reference to FIGS. 6 and 7.

The content reception component 510 may be configured as or otherwise support a means for receiving, by a server, a plurality of news stories from one or more sources. The story processing component 512 may be configured as or otherwise support a means for processing, by the server, the received news stories using natural language processing to extract key story details and compute story embeddings. The newsworthiness scoring component 514 may be configured as or otherwise support a means for scoring, by the server, the processed news stories based on a regression-based model to determine a newsworthiness score for each story. The bias transformation component 516 may be configured as or otherwise support a means for transforming, by the server, the news stories into revised versions with reduced bias in response to the scoring, the revised versions generated by applying a plurality of language models to the processed news stories. The version selection component 518 may be configured as or otherwise support a means for selecting, by the server, a final version of the news story from the revised versions based on a transformation weighted score that evaluates bias adjustment and content transformation. The story storage component 520 may be configured as or otherwise support a means for storing, by the server, the selected final version of the news story for distribution.

The output module 508 may manage output signals for the apparatus 502. For example, the output module 508 may receive signals from other components of the apparatus 502, such as the bias-mitigation component 506, and may transmit these signals to other components or devices. In some specific examples, the output module 508 may transmit output signals for display in a user interface, for storage in a database or data store, for further processing at a server or server cluster, or for any other processes at any number of devices or systems. In some cases, the output module 508 may be a component of an I/O controller 706 as described with reference to FIG. 7.

Figure 6:
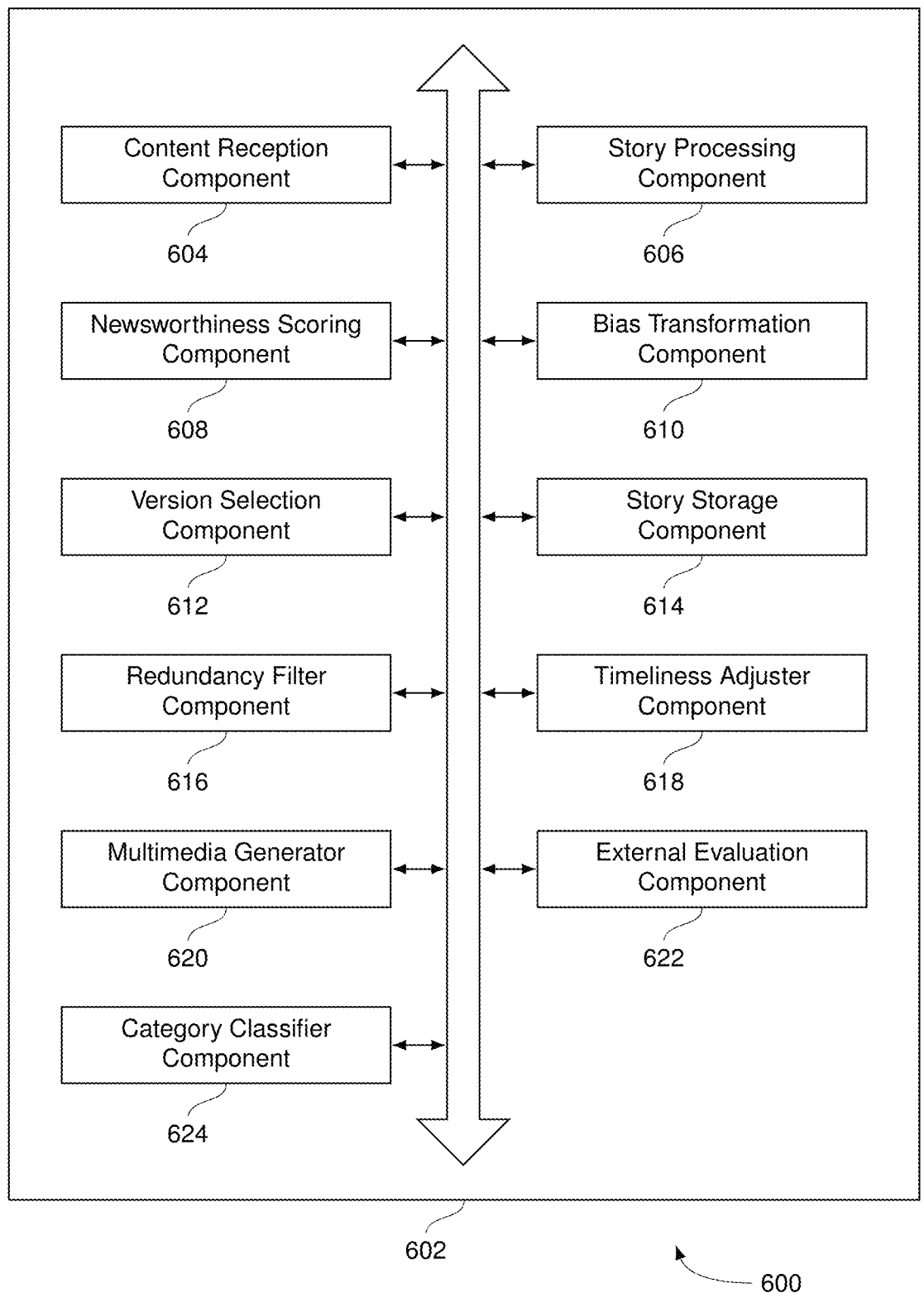
FIG. 6 shows a block diagram of a bias-mitigation component that supports transforming news content for bias mitigation and content adjustment in accordance with various aspects of the present disclosure.

FIG. 6 shows a block diagram 600 of a bias-mitigation component 602 that supports transforming news content for bias mitigation and content adjustment in accordance with various aspects of the present disclosure. The bias-mitigation component 602 may be an example of aspects of a bias-mitigation component 506, a bias-mitigation component 704, or both, as described herein. The bias-mitigation component 602, or various components thereof, may be an example of means for performing various aspects of transforming news content for bias mitigation and content adjustment as described herein. For example, the bias-mitigation component 602 may include one or more of a content reception component 604, a story processing component 606, a newsworthiness scoring component 608, a bias transformation component 610, a version selection component 612, a story storage component 614, a redundancy filter component 616, a timeliness adjuster component 618, a multimedia generator component 620, an external evaluation component 622, a category classifier component 624, and/or other components. Each of these components may communicate, directly or indirectly, with one another (e.g., via one or more buses).

The content reception component 604 may be configured as or otherwise support a means for receiving (e.g., by a server or other computing device or platform) a plurality of news stories from one or more sources. In some implementations, the content reception component 604 may receive news stories in various formats, such as text, audio, or video files. The content reception component 604 may process these stories to extract relevant metadata, including publication time and source name. The content reception component 604 may handle a high volume of incoming news stories simultaneously, ensuring a diverse range of content is available for further processing. In some implementations, a story source may include stories provided by individual users or stories provided by an organization (e.g., a customer). For example, individual users may copy and paste in their own content through the content reception component 604.

The story processing component 606 may be configured as or otherwise support a means for processing (e.g., by a server or other computing device or platform) the received news stories using natural language processing to extract key story details and compute story embeddings. In some implementations, the story processing component 606 may utilize natural language processing to identify the core narrative elements of the news stories. The story processing component 606 may determine story embeddings that represent the story in a vectorized format. The story processing component 606 may process the news stories to determine similarity scores between them.

The newsworthiness scoring component 608 may be configured as or otherwise support a means for scoring (e.g., by a server or other computing device or platform) the processed news stories based on a regression-based model to determine a newsworthiness score for each story. In some implementations, the newsworthiness scoring component 608 may utilize a variety of factors such as timeliness, impact, prominence, controversy, and uniqueness to determine the score for each news story. The newsworthiness scoring component 608 may apply different weights to these factors, where the weight may represent the relative importance of each factor in the newsworthiness scoring process. For instance, the timeliness of a news story may be given a higher weight in the scoring model to reflect the importance of current events.

The bias transformation component 610 may be configured as or otherwise support a means for detecting biases and transforming (e.g., by a server or other computing device or platform) the news stories into revised versions with reduced bias in response to the scoring, the revised versions generated by applying a plurality of language models to the processed news stories. In some implementations, the bias transformation component 610 may apply a specific language model that may be pre-trained on a diverse dataset to ensure a broad understanding of language nuances.

In some implementations, the bias transformation component 610 may be configured to perform news source inherent bias detection. Some implementations may utilize a regression-based model to analyze and quantify inherent bias levels in news stories across predefined categories, such as political, cultural, or regional biases, derived from their originating sources. This data may be leveraged to assist organizations in identifying and addressing specific biases within their content. The processed data may support academic and research purposes, such as comparative studies on bias prevalence and mitigation strategies in news dissemination.

The bias transformation component 610 may be configured to perform regression-based bias quantification. It may utilize a regression model to evaluate and assign numerical bias scores across predefined categories (e.g., political, cultural, regional, etc.). Some implementations may assess both explicit and implicit bias indicators within news stories. The bias transformation component 610 may be configured to perform source-specific bias profiling. It may aggregate and analyze data from various news sources to build detailed profiles of inherent biases. These profiles may enable comparative assessments of bias prevalence among sources. The bias transformation component 610 may be configured to perform a dynamic bias trend analysis. It may track bias levels over time, identifying shifts or patterns in news content from specific sources. This feature may help detect evolving narratives or agendas.

Some implementations may facilitate organizational content improvement by assisting media organizations in identifying and mitigating biases within their own content to align with neutrality and trust goals. Some implementations may facilitate research and academic studies by providing a robust dataset for researchers studying bias prevalence, trends, and mitigation strategies across different media outlets and regions. Some implementations may facilitate media monitoring and certification by enables third-party evaluators or certifying bodies to assess and certify news sources based on their bias levels, fostering accountability and public trust.

In some implementations, the bias transformation component 610 may be configured to perform language model bias detection. Some implementations may employ a regression-based model to evaluate the efficacy of language models in detecting and correcting biases within text across various predefined categories. The collected data may inform developers of language models to enhance training methodologies, facilitating more neutral and equitable responses. Furthermore, the data may support academic and research efforts by providing insights for comparative analysis and the development of new algorithms aimed at minimizing bias.

The bias transformation component 610 may be configured to perform regression-based evaluation. It may utilize a regression-based model to evaluate the effectiveness of language models in identifying and correcting biases. The bias transformation component 610 may be configured to perform bias quantification. It may analyze outputs across predefined bias categories to quantify and benchmark performance. The bias transformation component 610 may be configured to provide a training feedback loop. It may provide actionable feedback to refine language model training methodologies for improved neutrality.

Some implementations may facilitate model optimization by helping developers optimize language models to reduce biased responses and enhance user trust. Some implementations may provide academic research support by supporting academic research by offering data for comparative analysis and algorithm development. Some implementations may facilitate bias minimization techniques by enabling the creation of advanced techniques for bias minimization in AI-generated content.

In some implementations, the bias transformation component 610 may be configured to perform predictive bias mapping. Some implementations may map bias trends across news sources and categories over time. Some implementations may forecast potential bias patterns and offer proactive recommendations for content creators. The bias transformation component 610 may be configured to use historical data to predict future bias tendencies. The bias transformation component 610 may be configured to perform dynamic updates based on emerging narratives and public opinion. The bias transformation component 610 may be configured to provide visualization tools for bias trends across geographic and categorical dimensions. Some implementations may facilitate early warning systems for publishers to address potential bias before dissemination. Some implementations may provide tools for academic researchers studying systemic bias in news ecosystems.

In some implementations, the bias transformation component 610 may be configured to provide dynamic bias-adaptive language models. Some implementations may dynamically adapt language models to address biases identified in real-time. Some implementations may use a regression-based model to monitor ongoing inputs and continuously adjusts the model's parameters. The adaptation may occur through feedback loops incorporating user interactions and contextual metadata to align outputs with evolving standards of neutrality and equity.

The bias transformation component 610 may be configured to perform real-time feedback integration. It may continuously incorporate user input and contextual metadata to adjust model outputs dynamically. The bias transformation component 610 may be configured to perform adaptive parameter tuning. It may modify regression model weights in real time based on evolving data streams. The bias transformation component 610 may be configured to perform iterative output refinement. It may generate bias-corrected outputs through successive evaluation and adjustments. Some implementations may facilitate real-time content creation systems (e.g., news or social media platforms). Some implementations may facilitate customer service chatbots adapting to situational and cultural sensitivities.

In some implementations, the bias transformation component 610 may be configured to perform multilingual bias detection and correction. Some implementations may detect and correct biases across multilingual texts by employing cross-linguistic regression analysis. Some implementations may identify linguistic and cultural discrepancies in model outputs and applies targeted corrections using pre-trained multilingual embeddings. Bias consistency may be ensured across languages by analyzing translation-induced shifts and normalizing results against predefined neutrality benchmarks. Some implementations may provide language localization based on customer geolocation and/or a language selection received from a user via a user interface.

The bias transformation component 610 may be configured to perform cross-linguistic bias analysis. It may compare and normalize bias levels across different languages to ensure uniform neutrality. The bias transformation component 610 may be configured to perform translation-induced bias mitigation. It may identify and adjust biases introduced during language translation. The bias transformation component 610 may be configured to perform language-specific fine-tuning. It may adapt models to regional linguistic nuances for precise bias detection and correction. Some implementations may facilitate multilingual news platforms ensuring consistent bias-free reporting. Some implementations may facilitate educational tools delivering unbiased, culturally inclusive materials.

In some implementations, the bias transformation component 610 may be configured to perform deep semantic bias assessment. Some implementations may employ deep semantic analysis to detect implicit and subtle biases in text. By leveraging knowledge graph-based representations and semantic embeddings, some implementations may identify biases embedded in contextual associations or narrative framing. The identified biases may be ranked and transformed through iterative refinement using advanced natural language processing models.

The bias transformation component 610 may be configured to perform knowledge graph-based analyses. It may detect subtle and implicit biases using graph-based contextual relationships. The bias transformation component 610 may be configured to perform semantic embedding comparisons. It may evaluate vectorized text representations to pinpoint hidden biases. The bias transformation component 610 may be configured to perform bias ranking by severity. It may assign scores to biases based on potential impact, prioritizing significant issues for correction. Some implementations may facilitate academic research into implicit bias in historical or legal texts. Some implementations may facilitate media analysis tools for bias evaluation in entertainment scripts or news content.

In some implementations, the bias transformation component 610 may be configured to provide an automated feedback loop for bias refinement. Some implementations may enhance language model training by incorporating automated feedback loops that identify and correct biases. Some implementations may flag bias-prone outputs, adjust the corresponding training data, and reintegrate the corrected examples into the training process. Active learning algorithms may prioritize the highest-impact corrections to optimize performance over time.

The bias transformation component 610 may be configured to perform automated error detection. It may identify and flag bias-prone outputs for refinement. The bias transformation component 610 may be configured to perform training data injection. It may integrate corrected examples into training datasets for iterative model improvement. The bias transformation component 610 may be configured to perform active learning prioritization. It may focus on high-impact corrections to maximize bias reduction with minimal resource use. Some implementations may facilitate continuous improvement of generative AI models for conversational agents. Some implementations may facilitate AI platforms used in regulated industries requiring ongoing bias mitigation.

In some implementations, the bias transformation component 610 may be configured to provide a bias monitoring dashboard. Some implementations may provide visualizations of bias metrics for language model outputs. The dashboard may integrate regression-based scoring to quantify bias levels across predefined categories and tracks trends over time. The dashboard may include filtering and alert mechanisms to flag content exceeding acceptable bias thresholds for immediate review.

The bias transformation component 610 may be configured to perform real-time visualization by displaying bias metrics and trends across outputs using interactive charts and dashboards. The bias transformation component 610 may be configured to perform automated alerts by triggering notifications when bias levels exceed predefined thresholds. The bias transformation component 610 may be configured to perform drill-down capabilities by enabling detailed investigation of bias sources and specific problem areas. Some implementations may provide corporate tools for managing automated content generation. Some implementations may facilitate media oversight platforms ensuring compliance with editorial standards.

The bias transformation component 610 may generate multiple revised versions of a single news story, each version reflecting a different degree of bias reduction. The language models may be selected based on their performance in reducing certain types of bias identified during the scoring process.

The version selection component 612 may be configured as or otherwise support a means for selecting (e.g., by a server or other computing device or platform) a final version of the news story from the revised versions based on a transformation weighted score that evaluates bias adjustment and content transformation. In some implementations, the version selection component 612 may apply a threshold to the transformation weighted score to determine the final version of the news story. The final version of the news story may be selected from the revised versions by comparing the transformation weighted scores of each revised version. If multiple revised versions have the same transformation weighted score, the server may select the final version based on a secondary criterion such as the time of submission.

The story storage component 614 may be configured as or otherwise support a means for storing (e.g., by a server or other computing device or platform) the selected final version of the news story for distribution. In some implementations, the story storage component 614 may utilize a database system to maintain the final version of the news story. The database system may be a relational database management system that organizes the data in a structured manner. The story storage component 614 may also employ cloud storage solutions to ensure the availability of the news story for distribution across various platforms.

The redundancy filter component 616 may be configured as or otherwise support a means for filtering (e.g., by a server or other computing device or platform) the received news stories in response to a similarity threshold. In some implementations, the redundancy filter component 616 may determine a similarity score for each received news story by comparing it to previously processed stories. The redundancy filter component 616 may use a pre-trained embedding model to convert the text of the news stories into vectorized form for comparison. If the redundancy filter component 616 determines that a news story's similarity score exceeds the predefined threshold, the story may be marked as redundant.

In some examples, the timeliness adjuster component 618 may be configured as or otherwise support a means for adjusting (e.g., by a server or other computing device or platform) the transformation weighted score based on a timeliness factor. The timeliness factor may be derived from the publication metadata of the news stories. In some implementations, the timeliness adjuster component 618 may utilize the publication time included within the publication metadata to adjust the transformation weighted score. The timeliness factor may influence the transformation weighted score such that more recent stories may receive a higher score. The timeliness adjuster component 618 may consider the category of news, such as 'US' or 'World', as part of the publication metadata when determining the timeliness factor.

In some examples, the multimedia generator component 620 may be configured as or otherwise support a means for generating (e.g., by a server or other computing device or platform) an audio or visual representation of the selected final version of the news story for distribution across multimedia platforms. In some implementations, the multimedia generator component 620 may utilize a text-to-speech engine to convert the selected final version of the news story into an audio file. In some implementations, the multimedia generator component 620 may employ a graphics engine to create visual elements such as images or videos that accompany the text of the news story. In some implementations, the multimedia generator component 620 may format the audio or visual representation to be compatible with various multimedia platforms such as social media, news websites, and mobile applications.

In some examples, the external evaluation component 622 may be configured as or otherwise support a means for passing (e.g., by a server or other computing device or platform) the selected final version of the news story to an external party for an independent bias evaluation. In some implementations, the external party may be an independent organization specializing in media analysis. The external party may use their proprietary methods to assess the level of bias in the news story. The bias score provided by the external party may be numerical and may reflect the degree of neutrality in the news content.

In some examples, the category classifier component 624 may be configured as or otherwise support a means for categorizing (e.g., by a server or other computing device or platform) the received news stories into predefined content categories. In some implementations, the category classifier component 624 may utilize predefined criteria to assign each news story to a relevant category such as politics, sports, or technology. In some implementations, the category classifier component 624 may reference a database of keywords and phrases associated with different content categories to assist in the categorization process. In some implementations, the category classifier component 624 may apply machine learning algorithms to improve the accuracy of categorization over time.

Figure 7:
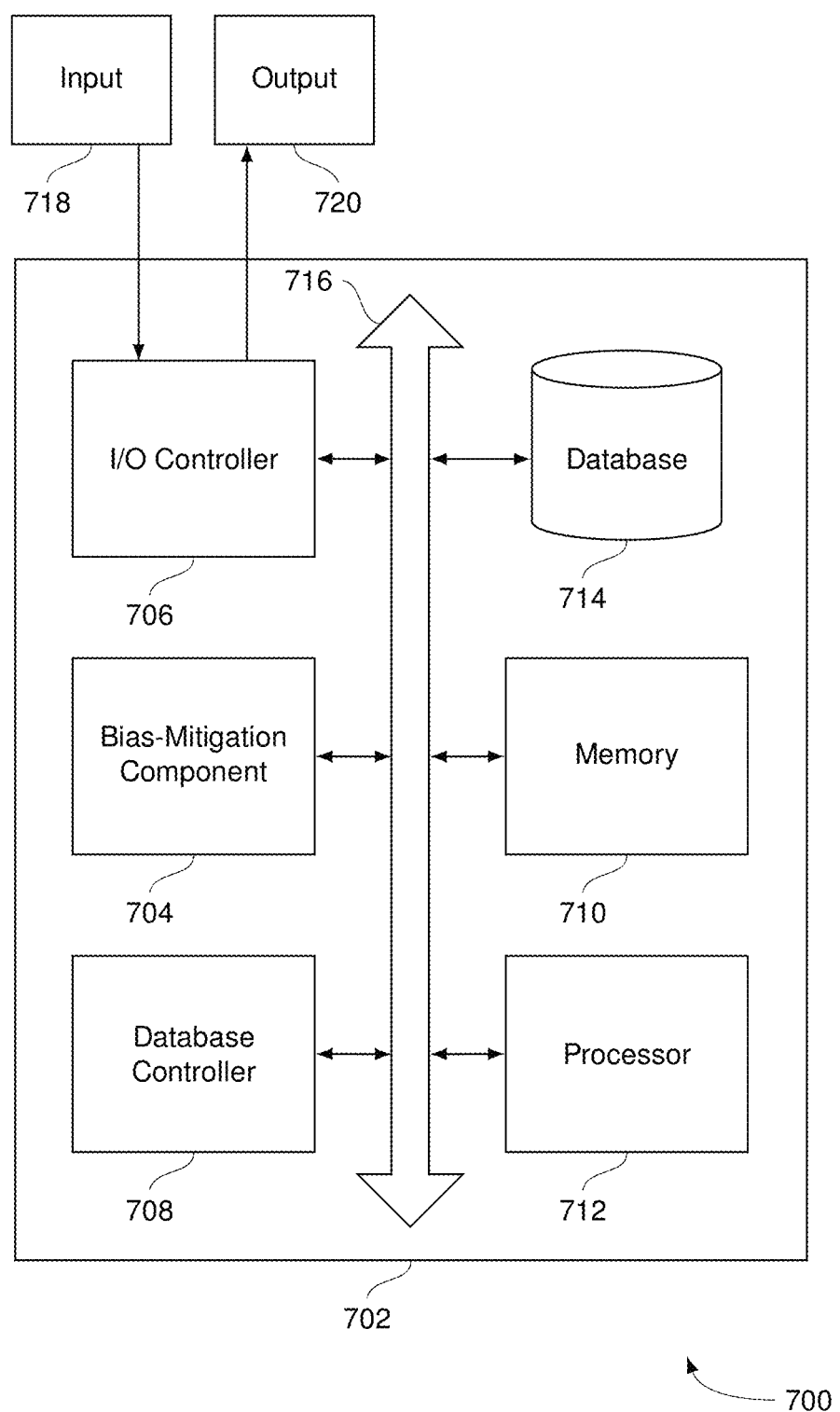
FIG. 7 shows a diagram of a system including a device that supports transforming news content for bias mitigation and content adjustment in accordance with various aspects of the present disclosure.

FIG. 7 shows a diagram of a system 700 including a device 702 that supports transforming news content for bias mitigation and content adjustment in accordance with aspects of the present disclosure. The device 702 may be an example of or include the components of a database server or an apparatus 502 as described herein. The device 702 may include components for bi-directional data communications including components for transmitting and receiving communications, including a bias-mitigation component 704, an I/O controller 706, a database controller 708, memory 710, a processor 712, and a database 714. These components may be in electronic communication via one or more buses (e.g., bus 716).

The bias-mitigation component 704 may be an example of a bias-mitigation component 506 or 602 as described herein. For example, the bias-mitigation component 704 may perform any of the methods or processes described above with reference to FIGS. 5 and 6. In some cases, the bias-mitigation component 704 may be implemented in hardware, software executed by a processor, firmware, or any combination thereof.

The I/O controller 706 may manage input signals 718 and output signals 720 for the device 702. The I/O controller 706 may also manage peripherals not integrated into the device 702. In some cases, the I/O controller 706 may represent a physical connection or port to an external peripheral. In some cases, the I/O controller 706 may utilize an operating system such as iOS®, ANDROID®, MS-DOS®, MS-WINDOWS®, OS/2®, UNIX®, LINUX®, or another known operating system. In other cases, the I/O controller 706 may represent or interact with a modem, a keyboard, a mouse, a touchscreen, or a similar device. In some cases, the I/O controller 706 may be implemented as part of a processor. In some cases, a user may interact with the device 702 via the I/O controller 706 or via hardware components controlled by the I/O controller 706.

The database controller 708 may manage data storage and processing in a database 714. In some cases, a user may interact with the database controller 708. In other cases, the database controller 708 may operate automatically without user interaction. The database 714 may be an example of a single database, a distributed database, multiple distributed databases, a data store, a data lake, or an emergency backup database.

Memory 710 may include random-access memory (RAM) and read-only memory (ROM). The memory 710 may store computer-readable, computer-executable software including instructions that, when executed, cause the processor to perform various functions described herein. In some cases, the memory 710 may contain, among other things, a basic input/output system (BIOS) which may control basic hardware or software operation such as the interaction with peripheral components or devices.

The processor 712 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 712 may be configured to operate a memory array using a memory controller. In other cases, a memory controller may be integrated into the processor 712. The processor 712 may be configured to execute computer-readable instructions stored in a memory 710 to perform various functions (e.g., functions or tasks supporting transforming news content for bias mitigation and content adjustment).

Figure 8:
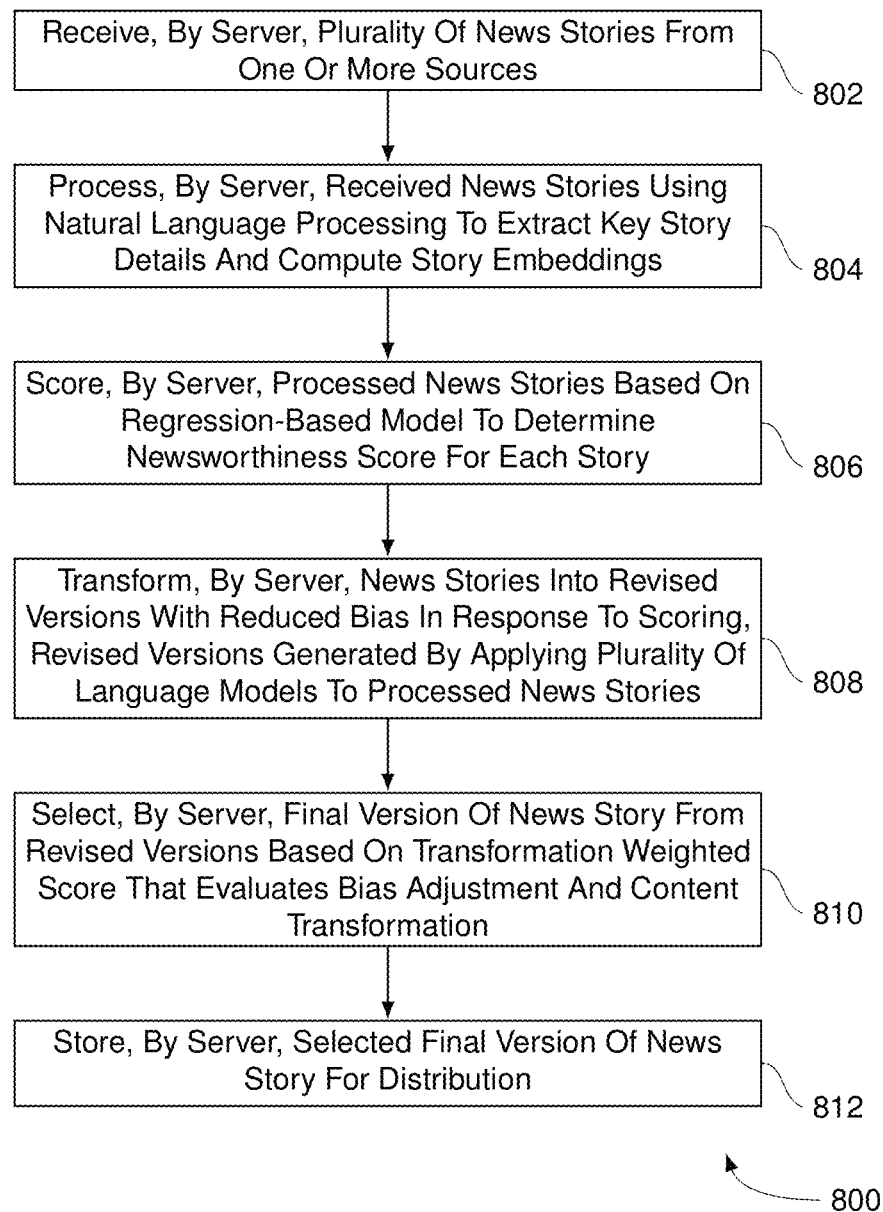
FIGS. 8 and 9 show flowcharts illustrating methods that support transforming news content for bias mitigation and content adjustment in accordance with various aspects of the present disclosure.

FIG. 8 shows a flowchart illustrating a method 800 that supports transforming news content for bias mitigation and content adjustment in accordance with various aspects of the present disclosure. The operations of the method 800 may be implemented by one or more components of a networked computing system as described herein. For example, the operations of the method 800 may be performed by a bias-mitigation component as described with reference to FIGS. 5 through 7. In some examples, one or more components of a networked computing system may execute a set of instructions to control the functional elements of the component(s) to perform the described functions. Additionally or alternatively, the one or more components of a networked computing system may perform aspects of the described functions using special-purpose hardware.

At 802, the method 800 may include receiving, by a server, a plurality of news stories from one or more sources. The operations of 802 may be performed in accordance with examples as disclosed herein. In some examples, aspects of the operations of 802 may be performed by a content reception component 604 as described with reference to FIG. 6.

At 804, the method 800 may include processing, by the server, the received news stories using natural language processing to extract key story details and compute story embeddings. The operations of 804 may be performed in accordance with examples as disclosed herein. In some examples, aspects of the operations of 804 may be performed by a story processing component 606 as described with reference to FIG. 6.

At 806, the method 800 may include scoring, by the server, the processed news stories based on a regression-based model to determine a newsworthiness score for each story. The operations of 806 may be performed in accordance with examples as disclosed herein. In some examples, aspects of the operations of 806 may be performed by a newsworthiness scoring component 608 as described with reference to FIG. 6.

At 808, the method 800 may include transforming, by the server, the news stories into revised versions with reduced bias in response to the scoring, the revised versions generated by applying a plurality of language models to the processed news stories. The operations of 808 may be performed in accordance with examples as disclosed herein. In some examples, aspects of the operations of 808 may be performed by a bias transformation component 610 as described with reference to FIG. 6.

At 810, the method 800 may include selecting, by the server, a final version of the news story from the revised versions based on a transformation weighted score that evaluates bias adjustment and content transformation. The operations of 810 may be performed in accordance with examples as disclosed herein. In some examples, aspects of the operations of 810 may be performed by a version selection component 612 as described with reference to FIG. 6.

At 812, the method 800 may include storing, by the server, the selected final version of the news story for distribution. The operations of 812 may be performed in accordance with examples as disclosed herein. In some examples, aspects of the operations of 812 may be performed by a story storage component 614 as described with reference to FIG. 6.

Figure 9:
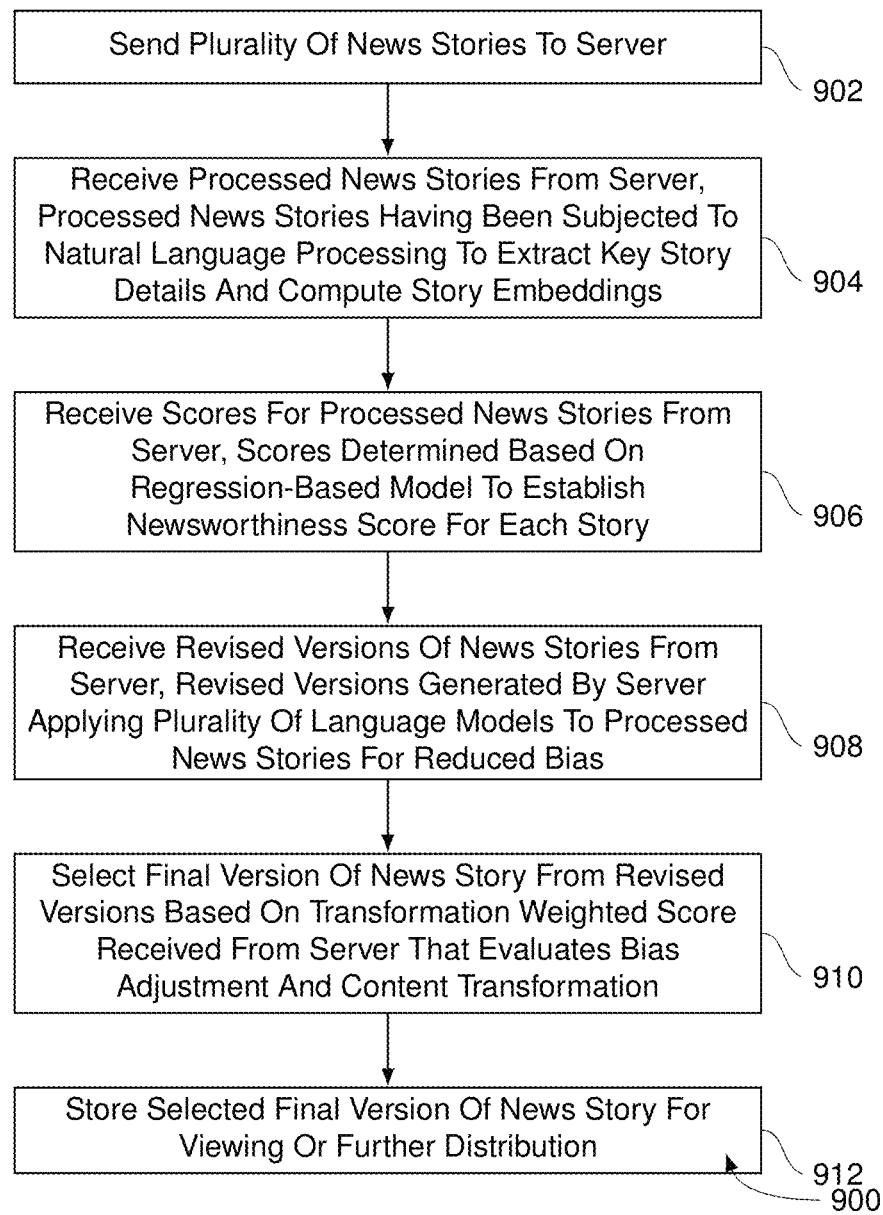

FIG. 9 shows a flowchart illustrating a method 900 that supports transforming news content for bias mitigation and content adjustment in accordance with various aspects of the present disclosure. The operations of the method 900 may be implemented by one or more components of a networked computing system as described herein. For example, the operations of the method 900 may be performed by a bias-mitigation component as described with reference to FIGS. 5 through 7. In some examples, one or more components of a networked computing system may execute a set of instructions to control the functional elements of the component(s) to perform the described functions. Additionally or alternatively, the one or more components of a networked computing system may perform aspects of the described functions using special-purpose hardware.

At 902, the method 900 may include sending, by a user device, a plurality of news stories to a server. The operations of 902 may be performed in accordance with examples as disclosed herein. In some examples, aspects of the operations of 902 may be performed by a content reception component 604 as described with reference to FIG. 6.

At 904, the method 900 may include receiving, by the user device, processed news stories from the server, the processed news stories having been subjected to natural language processing to extract key story details and compute story embeddings. The operations of 904 may be performed in accordance with examples as disclosed herein. In some examples, aspects of the operations of 904 may be performed by a story processing component 606 as described with reference to FIG. 6.

At 906, the method 900 may include receiving, by the user device, scores for the processed news stories from the server, the scores determined based on a regression-based model to establish a newsworthiness score for each story. The operations of 906 may be performed in accordance with examples as disclosed herein. In some examples, aspects of the operations of 906 may be performed by a newsworthiness scoring component 608 as described with reference to FIG. 6.

At 908, the method 900 may include receiving, by the user device, revised versions of the news stories from the server, the revised versions generated by the server applying a plurality of language models to the processed news stories for reduced bias. The operations of 908 may be performed in accordance with examples as disclosed herein. In some examples, aspects of the operations of 908 may be performed by a bias transformation component 610 as described with reference to FIG. 6.

At 910, the method 900 may include selecting, by the user device, a final version of the news story from the revised versions based on a transformation weighted score received from the server that evaluates bias adjustment and content transformation. The operations of 910 may be performed in accordance with examples as disclosed herein. In some examples, aspects of the operations of 910 may be performed by a version selection component 612 as described with reference to FIG. 6.

At 912, the method 900 may include storing, by the user device, the selected final version of the news story for viewing or further distribution. The operations of 912 may be performed in accordance with examples as disclosed herein. In some examples, aspects of the operations of 912 may be performed by a story storage component 614 as described with reference to FIG. 6.

It should be noted that the methods described herein describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for transforming news content for bias mitigation and content adjustment, comprising:
   receiving, by a server, news stories from one or more sources, the news stories including a first news story;
   processing, by the server, the news stories using natural language processing to extract key story details and compute story embeddings;
   scoring, by the server, the processed news based on the key story details and the story embeddings using a regression-based model to determine newsworthiness scores for the news stories;
   transforming, by the server, individual ones of the news stories into individual sets of revised versions with different reduced bias in response to the scoring, the individual sets of revised versions generated by applying a different language models to the individual ones of the news stories, including transforming the first news story into a first revised version based on application of a first language model, and into a second revised version based on application of a second language model;

generating individual transformation weighted scores for individual revised versions that reflect bias adjustment and content transformation, such that a first transformation weighted score is generated for the first revised version, and a second transformation weighted score is generated for the second revised version;

selecting, by the server, individual final versions of the individual ones of the news stories from the individual sets of revised versions based on the individual transformation weighted scores, including selecting the first revised version as a first final version of the first news story based on the first transformation weighted score; and storing, by the server, selected ones of the individual final versions for distribution, including storing the first final version for distribution.

2. The method of claim 1, further comprising identifying individual biases of individual ones of the one or more sources.

3. The method of claim 2, further comprising implementing regression to perform comparative analyses between the one or more sources.

4. The method of claim 1, further comprising using regression analysis to identify an effectiveness of individual ones of the different language models for bias detection and remediation.

5. The method of claim 1, further comprising filtering the news stories in response to a similarity threshold, wherein the individual ones of the news stories exceeding the similarity threshold are flagged as redundant and not processed further.

6. The method of claim 1, further comprising adjusting the individual transformation weighted scores based on a timeliness factor, wherein the timeliness factor is derived from publication metadata of the news stories.

7. The method of claim 1, further comprising generating an audio or visual representation of the selected ones of the individual final versions for distribution across multimedia platforms.

8. The method of claim 1, further comprising passing the selected ones of the individual final versions to an external party for an independent bias evaluation, wherein the external party provides individual third-party bias scores that are factored into the individual transformation weighted scores.

9. The method of claim 1, further comprising categorizing the news stories into predefined content categories, wherein the scoring and transforming are tailored based on specific content category of the individual ones of the news stories.

10. The method of claim 1, wherein the processing includes identifying geographic relevance and sentiment indicators from language patterns of the news stories.

11. The method of claim 1, wherein the scoring further includes assigning individual controversy scores reflecting potential of the individual ones of the news stories to spark debate or strong opinions.

12. The method of claim 1, wherein the individual revised versions are further evaluated for lexical changes, including adjustments to word choice and phrasing for enhanced precision.

13. The method of claim 1, wherein the server further applies a weighting adjustment to the individual transformation weighted scores based on the uniqueness and timeliness of content of the news stories.

14. A system configured for transforming news content for bias mitigation and content adjustment, comprising:

a processor;

memory coupled with the processor; and instructions stored in the memory and executable by the processor to cause the system to:

receive news stories from one or more sources, the news stories including a first news story;

process the news stories using natural language processing to extract key story details and compute story embeddings;

score the news stories based on the key story details and the story embeddings using a regression-based model to determine newsworthiness scores for the news stories each story;

transform individual ones of the news stories into individual sets of revised versions with different reduced bias in response to the scoring, the individual sets of revised versions generated by applying different language models to the individual ones of the news stories, such that the first news story is transformed into a first revised version based on application of a first language model, and transformed into a second revised version based on application of a second language model;

generate individual transformation weighted scores for individual revised versions that reflect bias adjustment and content transformation, such that a first transformation weighted score is generated for the first revised version, and a second transformation weighted score is generated for the second revised version;

select individual final versions of the individual ones of the news stories from the individual sets of revised versions based on the transformation weighted scores, such that the first revised version is selected as a first final version of the first news story based on the first transformation weighted score; and store selected ones of the individual final versions for distribution, such that the first final version is stored for distribution.

15. The system of claim 14, wherein the instructions are further executable by the processor to cause the system to: filter the news stories in response to a similarity threshold, wherein the individual ones of the news stories exceeding the similarity threshold are flagged as redundant and not processed further.

16. The system of claim 14, wherein the instructions are further executable by the processor to cause the system to: adjust the individual transformation weighted scores based on a timeliness factor, wherein the timeliness factor is derived from the publication metadata of the news stories.

17. The system of claim 14, wherein the instructions are further executable by the processor to cause the system to: generate an audio or visual representation of the selected ones of the individual final versions for distribution across multimedia platforms.

18. The system of claim 14, wherein the instructions are further executable by the processor to cause the system to: pass the selected ones of the individual final versions to an external party for an independent bias evaluation, wherein the external party provides individual third-party bias scores that are factored into the individual transformation weighted scores.

19. The system of claim 14, wherein the instructions are further executable by the processor to cause the system to: categorize the news stories into predefined content categories, wherein scoring and transforming are tailored based on specific content category of the individual ones of the news stories.

20. A non-transitory computer-readable medium storing code for transforming news content for bias mitigation and content adjustment, the code comprising instructions executable by a processor to:
receive news stories from one or more sources, the news stories including a first news story;
process the news stories using natural language processing to extract key story details and compute story embeddings;
score the news stories based on the key story details and the story embeddings using a regression-based model to determine newsworthiness scores for the news stories;
transform individual ones of the news stories into individual sets of revised versions with different reduced bias in response to the scoring, the individual sets of the revised versions generated by applying different language models to the individual ones of the news stories, such that the first news story is transformed into a first revised version based on application of a first language model, and transformed into a second revised version based on application of a second language model;
generate individual transformation weighted scores for individual revised versions that reflect bias adjustment and content transformation, such that a first transformation weighted score is generated for the first revised version, and a second transformation weighted score is generated for the second revised version;
select individual final versions of the individual ones of the news stories from the individual sets of revised versions based on the transformation weighted scores, such that the first revised version is selected as a first final version of the first news story based on the first transformation weighted score; and
store selected ones of the individual final versions for distribution, such that the first final version is stored for distribution.

* * * * *

UNITED STATES PATENT AND TRADEMARK OFFICE
CERTIFICATE OF CORRECTION

PATENT NO. : 12,430,307 B1
APPLICATION NO. : 19/024474
DATED : September 30, 2025
INVENTOR(S) : Jeffrey Don Crump It is certified that error appears in the above-identified patent and that said Letters Patent is hereby corrected as shown below:

In the Claims

In Claim 1, Column 24, Line 58, please replace "processed news" with --news stories--, therefor.
In Claim 1, Column 24, Line 66, please delete "a", therefor.
In Claim 14, Column 26, Line 15, please delete "each story", therefor.
In Claim 16, Column 26, Line 52, please replace "from the publication" with --from publication--, therefor.

Signed and Sealed this
Thirteenth Day of January, 2026

John A. Squires
*Director of the United States Patent and Trademark Office*